US012800500B2

(12) United States Patent
Ebrahimi et al.

(10) Patent No.: US 12,800,500 B2
(45) Date of Patent: Nov. 17, 2026

(54) CORRELATIVE HOLOGRAPHIC FLUORESCENCE MICROSCOPY FOR SINGLE-SHOT VOLUMETRIC IMAGING AND APPLICATIONS THEREOF

(71) Applicant: METROLASER, INC., Laguna Hills, CA (US)

(72) Inventors: Vahid Ebrahimi, Irvine, CA (US); Jacob George, Downey, CA (US)

(73) Assignee: METROLASER, INC., Laguna Hills, CA (US)

( * ) Notice: Subject to any disclaimer, the term of this patent is extended or adjusted under 35 U.S.C. 154(b) by 116 days.

(21) Appl. No.: 18/890,130

(22) Filed: Sep. 19, 2024

(65) Prior Publication Data

US 2026/0079111 A1 Mar. 19, 2026

(51) Int. Cl.
*G01N 21/64* (2006.01)
*G02B 5/00* (2006.01)
*G03H 1/00* (2006.01)
*G03H 1/08* (2006.01)

(52) U.S. Cl.
CPC ......... *G01N 21/6458* (2013.01); *G02B 5/001* (2013.01); *G03H 1/0866* (2013.01); *G01N 2021/6423* (2013.01); *G01N 2201/1293* (2013.01); *G01N 2201/1296* (2013.01); *G03H 2001/005* (2013.01)

(58) Field of Classification Search
CPC ........ G01N 21/6458; G01N 2021/6423; G01N 2201/1293; G01N 2201/1296; G02B 5/001; G03H 1/0866; G03H 2001/005
See application file for complete search history.

(56) References Cited

PUBLICATIONS

Vincent M. Rossi "Generating 3D fluorescent images via holographically informed fluorescent imaging (Conference Presentation)", Proc. SPIE PC12385, Three-Dimensional and Multidimensional Microscopy: Image Acquisition and Processing XXX, PC123850H (Mar. 15, 2023); https://doi.org/10.1117/12.2649390 (Year: 2023).*

Qureshi et al., "Medical image segmentation using deep semantic-based methods: A review of techniques, applications and emerging trends," Information Fusion, vol. 90, 2023, pp. 316-352, ISSN 1566-2535, https://doi.org/10.1016/j.inffus.2022.09.031. (Year: 2023).*

(Continued)

*Primary Examiner* — Casey Bryant
(74) *Attorney, Agent, or Firm* — Haynes and Boone, LLP

(57) ABSTRACT

A system and a method for imaging are provided for using in high-throughput imaging of bio-specimens, including, for example but not limited to, movements of bacteria or a colloidal suspension, and tracking of microscopic living organisms or particles. The system and method may be used for generating a volumetric image of a sample by combining holographic and fluorescence imaging techniques as disclosed herein. The system and method may include obtaining, via an optical imaging system, a fluorescence image and a digital hologram of a sample comprising one or more objects; generating a two-dimensional depth map of the one or more objects based on the digital hologram; correlating the two-dimensional depth map of the one or more objects with the fluorescence image of the sample; and generating a volumetric image of the one or more objects in a three-dimensional volume.

19 Claims, 12 Drawing Sheets

(56) References Cited

PUBLICATIONS

HoloFluoNet: Live cell imaging intelligence based on fused holography and fluorescence for virtual staining, cell segmentation, classification, and viability analysis, Engineering Applications of Artificial Intelligence, vol. 161, Part C, Dec 12, 2025, 112323 (Year: 2025).*

* cited by examiner

700c

700b

700a

CORRELATIVE HOLOGRAPHIC FLUORESCENCE MICROSCOPY FOR SINGLE-SHOT VOLUMETRIC IMAGING AND APPLICATIONS THEREOF

FIELD OF INVENTION

Embodiments of the present disclosure relate generally to imaging techniques, and more particularly, for example, to a system and a method for a hybrid imaging modality combining holographic and fluorescence imaging techniques.

BACKGROUND

Fluorescence imaging is a ubiquitous imaging modality in biological sciences. Volumetric widefield fluorescence imaging, for example, is normally performed by serial scanning the bio-specimen in the "z-direction", i.e., across the thickness of the sample. In a typical fluorescence microscopy, the z-scanning typically needs a step size less than half the axial resolution of the microscope. For example, imaging a volume of 100 μm thick sample at a wavelength of, for example, 525 nm using an objective lens with a numerical aperture (NA) of 0.75, a minimum step size of 0.9 μm may be required to cover the entire volume of the sample. This means, more than 100 steps in the z-direction are required to obtain the volumetric image of the sample in its entirety. This large number of "z-steps" effectively lowers the throughput of a "fluorescence microscope" significantly since an image is acquired at each z-step. This "slow" image acquisition process may increase photobleaching and phototoxicity due to the prolong and/or multiple exposures of electromagnetic radiation to the specimen.

Thus, this current standard of acquiring a volumetric image of a sample by scanning along the z-direction is not practical, and in some instances, nearly impossible to image dynamic bio-specimens, such as live bacteria, or to capture movements of a colloidal suspension, e.g., particle tracking. Thus, there is a need for a system and/or a method that can help with a high-throughput imaging process that can enable dynamic imaging and/or particle (or object) tracking in a volume.

SUMMARY

In accordance with one or more embodiments, a method of imaging is provided. The method may be used for generating a volumetric image of a sample by combining holographic and fluorescence imaging techniques as disclosed herein. The method may include obtaining, via an optical imaging system, a fluorescence image and a digital hologram of a sample comprising one or more objects; generating a two-dimensional depth map of the one or more objects based on the digital hologram; correlating the two-dimensional depth map of the one or more objects with the fluorescence image of the sample; and generating a volumetric image of the one or more objects in a three-dimensional volume.

In various embodiments, generating the two-dimensional depth map may include generating a three-dimensional map of the one or more objects based on the digital hologram; and generating the two-dimensional depth map from the three-dimensional map. In various embodiments, generating the three-dimensional map of the one or more objects may include determining position(s) of the one or more objects in the sample via a machine-learning model; and generating the three-dimensional map comprising positions of the one or more objects based on the determined position(s) of the one or more objects.

In accordance with one or more embodiments, the disclosed method may further include generating a binary segmentation map from the fluorescence image for one or more fluorescence colors. In various embodiments, generating the binary segmentation map from the fluorescence image may include applying a machine-learning algorithm to the fluorescence image.

In accordance with one or more embodiments, the disclosed method may further include overlapping the binary segmentation map for each of the one or more fluorescence colors with the two-dimensional depth map; and generating a segmentation depth color-coded map based on the overlapping of the binary segmentation and two-dimensional depth maps.

In various embodiments, the fluorescence image may be obtained via a first sensor of the optical imaging system and the digital hologram is obtained via a second sensor of the optical imaging system. In one or more embodiments, the fluorescence image may include an extended depth-of-field (EDOF) image acquired via an Axicon lens or an Axicon imaging setup. In various embodiments, the fluorescence image and the digital hologram may be obtained simultaneously, or within a single trigger or a snapshot.

In accordance with one or more embodiments, a system for imaging is provided. The system may be configured for generating a volumetric image of a sample by combining holographic and fluorescence imaging techniques as disclosed herein. The system may include an optical imaging tool configured to perform fluorescence microscopy and holographic microscopy; and a processor and a non-transitory computer readable medium operably coupled thereto, the processor operationally coupled and configured to control the optical imaging tool and to acquire data from the optical imaging tool, wherein the non-transitory computer readable medium comprising a plurality of instructions stored in association therewith that are accessible to, and executable by, the processor, to perform one or more operations. Such operations may include acquiring, via the optical imaging tool, a fluorescence image and a digital hologram of a sample comprising one or more objects; generating a two-dimensional depth map of the one or more objects based on the digital hologram; correlating the two-dimensional depth map of the one or more objects with the fluorescence image of the sample; and generating a volumetric image of the one or more objects in a three-dimensional volume.

In one or more embodiments, generating the two-dimensional depth map may include generating a three-dimensional map of the one or more objects based on the digital hologram; and generating the two-dimensional depth map from the three-dimensional map. In one or more embodiments, generating the three-dimensional map of the one or more objects may include determining position(s) of the one or more objects in the sample via a machine-learning model; and generating the three-dimensional map comprising positions of the one or more objects based on the determined position(s) of the one or more objects.

In one or more embodiments, the one or more operations may further include generating a binary segmentation map from the fluorescence image for one or more fluorescence colors. In one or more embodiments, generating the binary segmentation map from the fluorescence image may include applying a machine-learning algorithm to the fluorescence image.

In one or more embodiments, the one or more operations may further include overlapping the binary segmentation map for each of the one or more fluorescence colors with the two-dimensional depth map; and generating a segmentation depth color-coded map based on the overlapping of the binary segmentation and two-dimensional depth maps.

In one or more embodiments of the system, the optical imaging tool may include a first sensor configured to acquire the fluorescence image; and a second sensor configured to acquire the digital hologram. In one or more embodiments, the optical imaging tool may include an Axicon lens or an Axicon imaging setup and is further configured to acquire an extended depth-of-field (EDOF) fluorescence image. In one or more embodiments, the acquiring of the fluorescence image and the digital hologram occurs simultaneously, or within a single trigger or a snapshot.

In one or more embodiments, the one or more operations may further include acquiring, via the optical imaging tool, a series of fluorescence images and digital holograms of the sample; generating a series of volumetric images of the one or more objects based on the acquired series of fluorescence images and digital holograms; and outputting the volumetric images to a display.

In accordance with one or more embodiments, a method is provided. The method may include acquiring a fluorescence image and a digital hologram of a sample comprising one or more objects; generating a three-dimensional map of the one or more objects based on the digital hologram; generating a two-dimensional depth map from the three-dimensional map; generating a binary segmentation map from the fluorescence image for one or more fluorescence colors; generating a volumetric image of the one or more objects based on the two-dimensional depth map and the binary segmentation map; and outputting the volumetric image to a display.

BRIEF DESCRIPTION OF THE DRAWINGS

For a more complete understanding of the principles disclosed herein, and the advantages thereof, reference is now made to the following descriptions taken in conjunction with the accompanying drawings, in which.

Figure 1:
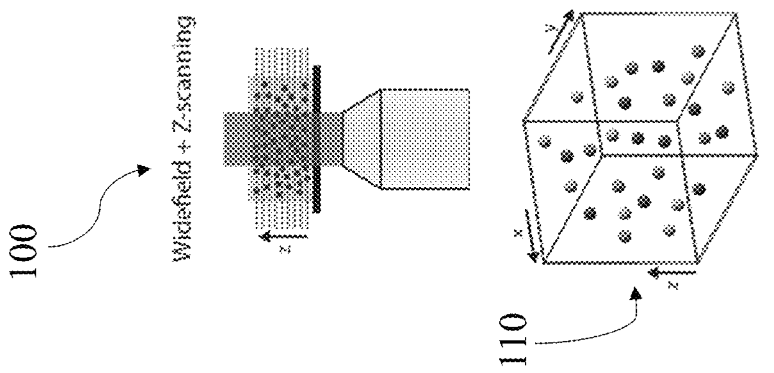
FIG. 1 shows a schematic of a fluorescence imaging mode.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

In accordance with various embodiments, a system and a method for imaging are described. The disclosed system and method can be used in high-throughput imaging of biospecimens, including, for example but not limited to, movements of bacteria or a colloidal suspension, and tracking of microscopic living organisms or particles. As disclosed herein, the system and method may include a hybrid imaging modality that combines holographic and fluorescence imaging techniques to generate volumetric images of samples in three-dimensional space.

In accordance with one or more embodiments, the disclosed system and method may include using an optical imaging tool or system to obtain or acquire a fluorescence image and a digital hologram of a sample having one or more objects, including particles and/or living organisms, such as bacteria. In one or more embodiments, the disclosed system and method may include generating a three-dimensional map of the one or more objects/particles/organisms based on the digital hologram, generating a two-dimensional depth map from the three-dimensional map, correlating the two-dimensional depth map with the fluorescence image of the sample, and generating a volumetric image of the one or more objects in a three-dimensional space/volume.

As disclosed herein, the disclosed system and method may include a single-shot correlative volumetric microscopy technique for imaging living organisms and/or particles. In one or more embodiments, the optical imaging tool or system may include components configured for an extended depth of field (EDOF) fluorescence microscopy and digital holographic microscopy (DHM).

In one or more embodiments, the optical imaging tool or system may include components configured for two simultaneous and different excitations and detections to obtain/acquire a fluorescence image and a holographic image (or simply a hologram) of a field of view of the sample. In one or more embodiments, the optical imaging tool or system may include optical components configured to capture a holographic image, for example, by using a 635 nm diode laser as an excitation beam. Once illuminated by the laser light, the sample may produce scattering that is interfered with the main laser beam and is imaged on a first sensor (e.g., a complementary metal-oxide semiconductor (CMOS) sensor or a charged-coupled device (CCD) sensor), for example, by a 4f imaging system, in one or more embodiments. Similarly, the disclosed optical imaging tool or system may include optical components configured to use, for example, a 488 nm diode laser, to excite or cause fluorescing of the fluorescent particles in the sample, in one or more embodiments. The fluorescence emission from the particles may be obtained or imaged using a second sensor (e.g., a CCD or a CMOS sensor) using multiple 4f systems, in one or more embodiments.

In one or more embodiments, the disclosed optical imaging tool or system may include optical components configured to implement fluorescence EDOF microscopy. In such implementations, the optical imaging tool or system may include an Axicon lens or an Axicon imaging setup conjugated to the back focal plane of an objective lens to capture an image with a large depth-of-field. An Axicon lens can generate Bessel beams that are considered nondiffracting beams and can maintain their profile over a much larger traveling range compared to Gaussian beams, hence the extended DOF. In one or more embodiments, the disclosed optical imaging tool or system may be configured for imaging 200 nm fluorescent beads using a 40×/NA0.75 objective lens. In such instances, a depth of field of 130 μm is achieved using the disclosed optical setup, which is capable of more than 70 times larger than DOF compared to imaging with the same objective lens in a widefield configuration.

As disclosed herein, the disclosed system and method can be implemented using the disclosed EDOF technique with DHM to simultaneously obtain a projected fluorescence image of the particles in a volume and find their depth using a recorded digital hologram, in accordance with various embodiments. In one or more embodiments, the disclosed techniques enable using correlation between them to generate volumetric images of particles in a thick sample space/volume. In one or more embodiments, the disclosed system and method can be configured for use with multicolor light-source for bio-imaging applications, including but not limited to bacteria imaging and field particle tracking. The following descriptions with respect to FIGS. 1-12 provide detailed information of the disclosed system and method for imaging that combines fluorescence and holographic imaging.

FIG. 1 shows a schematic of a fluorescence imaging mode 100 that includes scanning of a sample of particles in the z-direction. As illustrated in FIG. 1, the imaging mode 100 requires performing iterative imaging steps in the z-direction in order to obtain a volumetric image (i.e., image in a three-dimensional space/volume) of the sample in its entirety. Although the resulting image 110 shows imaged particles of the sample in a three-dimensional space/volume, a large number of "z-steps" performed with this approach effectively lowers the throughput of the imaging process, which may inadvertently increase potential photobleaching and phototoxicity due to the prolong and/or multiple exposures during iterative imaging steps. To overcome such problematic issues, the disclosed system and method employ a hybrid imaging modality by combining extended depth of field fluorescence microscopy and digital holographic microscopy, which are further described below.

Figure 2A:
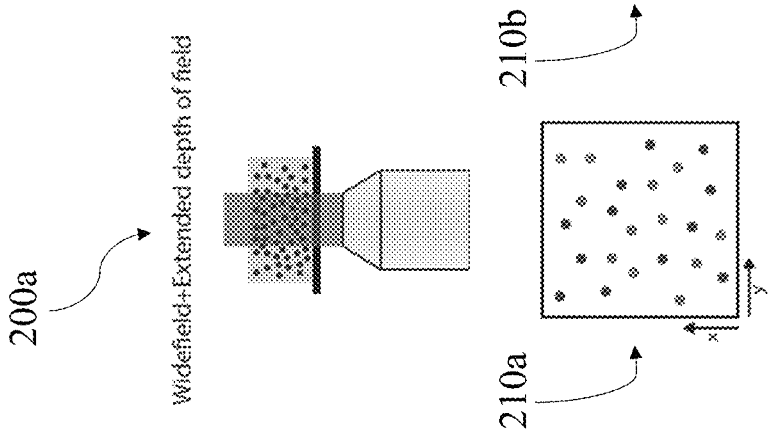
FIGS. 2A, 2B, and 2C illustrate schematics of the disclosed hybrid imaging modality, in accordance with various embodiments.
Figure 2B:
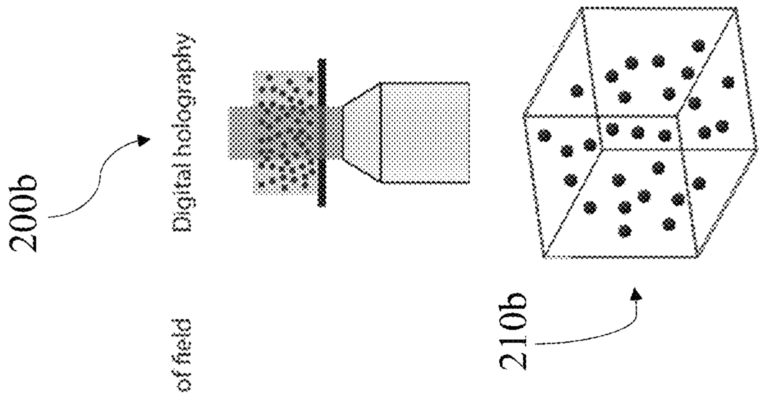
Figure 2C:
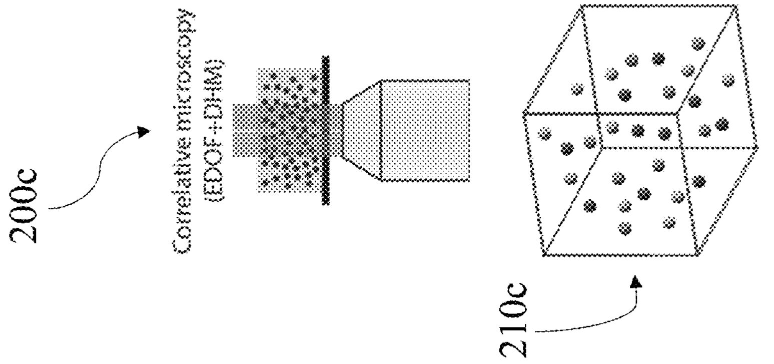

FIGS. 2A, 2B, and 2C illustrate schematics of the disclosed hybrid imaging modality, in accordance with various embodiments. FIG. 2A shows a schematic 200*a* of an extended depth of field fluorescence (EDOF) microscopic imaging technique along with the resulting image 210*a*, accordance with various embodiments. As shown in FIG. 2A, this approach produces a two-dimensional projected image, as shown in image 210*a*, of all the fluorescent particles within a volume that is equal to the depth of field of the microscope. Furthermore, this approach can be combined with multicolor imaging to distinguish between different kinds of particles that express different fluorescence emissions.

FIG. 2B shows a schematic 200*b* of a digital holographic microscopic (DHM) imaging technique along with the resulting image 210*b*, accordance with various embodiments. As shown in FIG. 2B, applying the DHM imaging technique simultaneously can produce a hologram of the same volume, as shown in the resulting image 210*b*. The resulting image 210*b* can be further processed to obtain the depth of each particle in the volume. Due to being a label-free approach, the DHM imaging technique cannot be used with different wavelengths to distinguish between different kinds of particles.

FIG. 2C shows a schematic 200*c* of a correlative imaging technique that combines EDOF and DHM along with the resulting image 210*c*, accordance with various embodiments. Specifically, the schematic 200*c* of the correlative imaging technique shows the disclosed working principle of the dual-mode correlative fluorescence holographic microscopy, in accordance with various embodiments. By correlating the processed DHM with the two-dimensional EDOF fluorescence image, the depth of each particle can be determined as shown in the resulting image 210*c*, depicted in FIG. 2C.

In accordance with one or more embodiments, the disclosed correlative imaging technique may be configured for single-shot volumetric particle imaging, where a single EDOF image and a single DHM image are obtained to generate a single volumetric image of the sample. In various embodiments, the correlative imaging technique may be processed iteratively so that a series of volumetric images may be generated. In such implementations, the series of volumetric images generated from the disclosed system and method may be presented or displayed as a moving picture, where each volumetric image may constitute a frame in the moving picture. This may enable high-throughput imaging capable of capturing movements of bacteria or a colloidal suspension, and tracking of microscopic living organisms or particles, in accordance with one or more embodiments.

Figure 3:
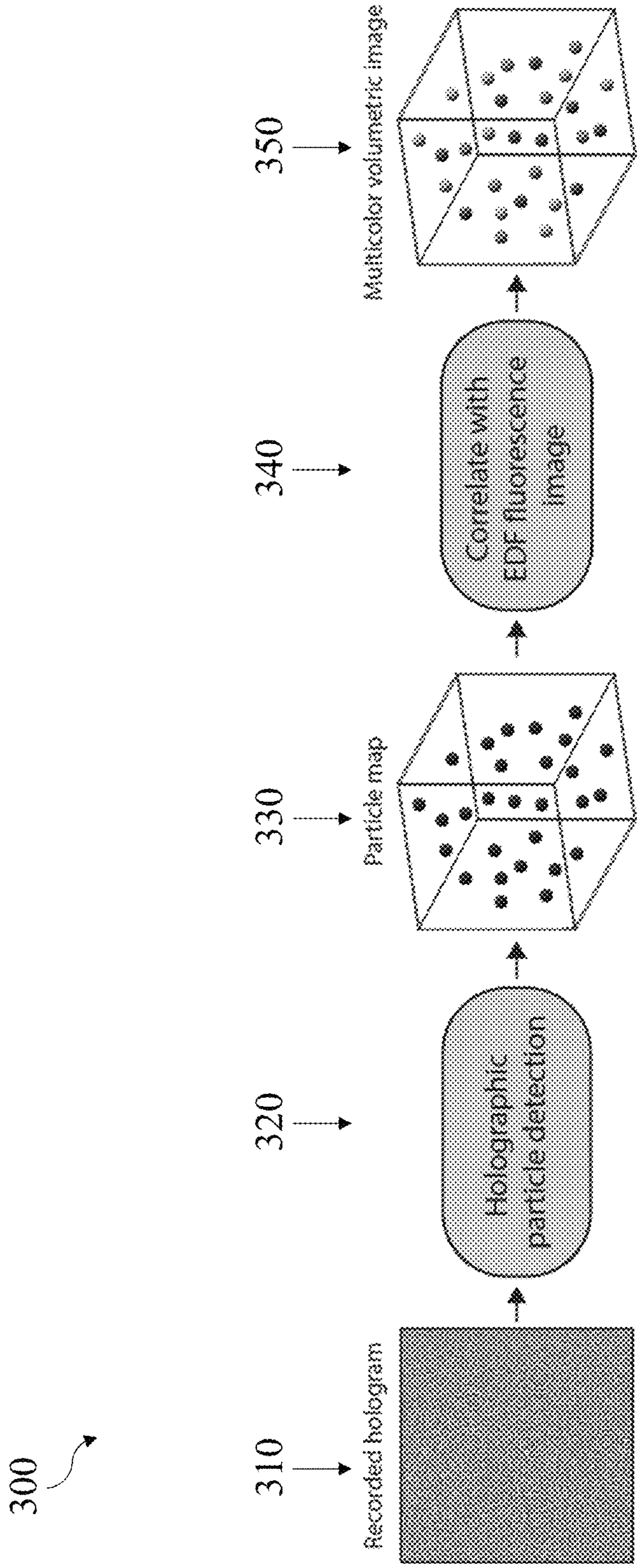
FIG. 3 depicts a schematic process flow of the disclosed hybrid imaging modality, in accordance with various embodiments.

FIG. 3 depicts a schematic process flow 300 of the disclosed hybrid imaging modality, in accordance with various embodiments. As illustrated in FIG. 3, the process flow 300 includes obtaining/acquiring a holographic image (i.e., a hologram) 310, which is then processed via a holographic particle detection algorithm for background removal and particle detection, or simply referred to herein as an algorithm (e.g., a machine-learning model or algorithm) for detecting particles 320 in the hologram 310. In other words, a conventional technique or a machine learning-based approach can be used for detecting the positions of the particles in the volume from the holographic image or the hologram. Using the location information of the particles, a particle map 330 of all the detected particles in a volume is generated by analyzing a recorded digital hologram as further illustrated in FIG. 3. This particle map 330 is correlated with an EDOF fluorescence image 340 of the same space/volume of the sample to determine the depth of each particle in the fluorescence image, which is illustrated as a (multi-color) volumetric image 350 of the sample that contains the particles, as depicted in FIG. 3.

Figure 4:
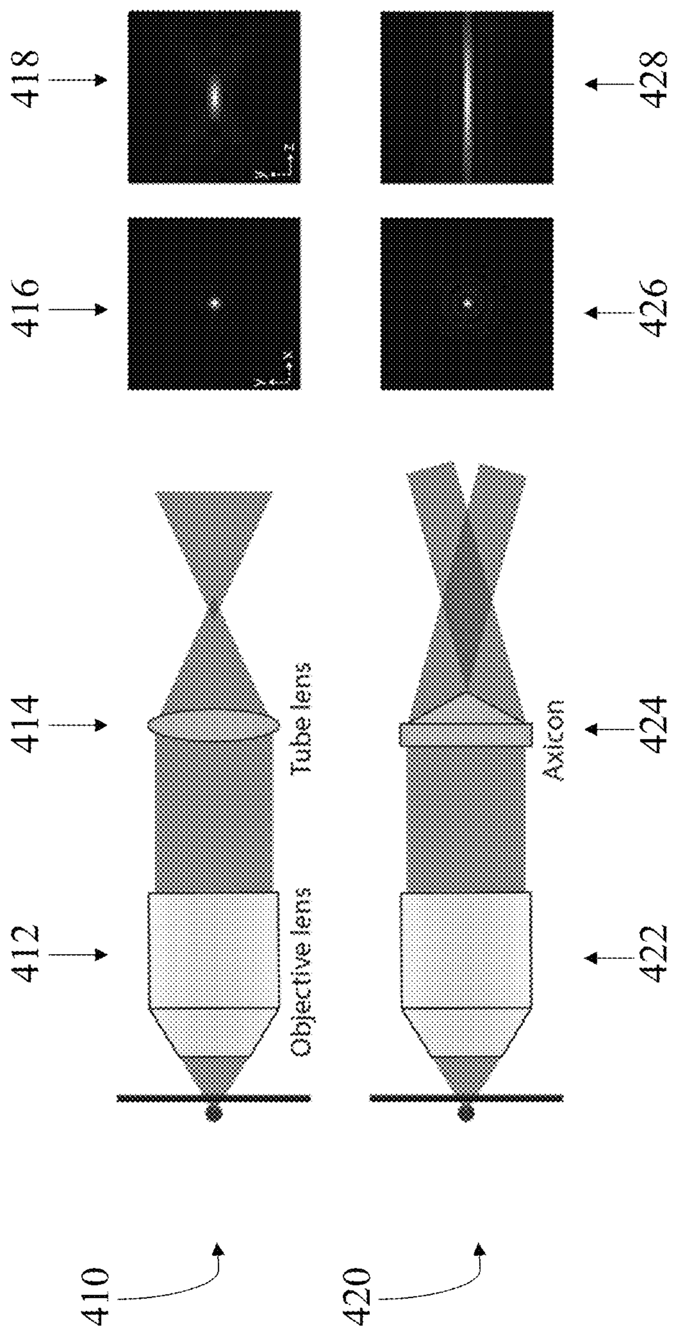
FIG. 4 illustrates example optical configurations for various fluorescence imaging techniques, in accordance with various embodiments.

FIG. 4 illustrates example optical configurations for fluorescence imaging techniques 410 and 420, in accordance with various embodiments. As illustrated in FIG. 4, the optical configuration for fluorescence imaging technique 410 uses a standard objective lens 412 and a tube lens 414, which result in its point spread function (PSF) of a circular focus area as shown in plot 416 for xy dimensions and an oval shape focus area as shown in plot 418 for yz dimensions. On the other hand, the optical configuration for fluorescence imaging technique 420 uses a standard objective lens 422 and an Axicon lens 424, which result in the PSF of a circular focus area as shown in plot 426 for xy dimensions, but a much longer an oval shape focus area (compared to that shown in plot 418) as shown in plot 428 for yz dimensions, as shown in FIG. 4. The axial extent of the PSF is theoretically limited by the numerical aperture of an objective lens according to Equation 1 below:

$$FWHM_z = \frac{2 \times \lambda_{em}}{NA^2} \quad \text{Eq. 1}$$

where FWHMz stands for the full width at half maximum of the PSF in z direction, $\lambda_{em}$ stands for the fluorescence emission wavelength, and NA stands for the numerical aperture of the objective lens. For example, at an emission wavelength of 525 nm and with an objective lens with NA of 0.75 the axial resolution is approximately 1.9 μm. Such shallow depth of field is not enough for simultaneously monitoring all the particles within a thick volume. Therefore, a serial z-scanning is inevitable for volumetric imaging with a widefield epi-fluorescence microscope.

To avoid serial z-scanning, one of the solutions is to engineer the PSF of a microscope to extend its limit in the axial direction. Various PSF engineering techniques are reported for EDOF microscopy. The majority of these techniques rely on pupil engineering at the back focal plane (BFP) of the objective lens in the detection path. The pupil engineering techniques include using an amplitude mask or a phase mask that results in extending the axial dimension of a PSF while maintaining the lateral resolution.

As depicted in the optical configuration for fluorescence imaging technique 420, the Axicon lens 424 instead of a regular tube lens 414 can be used. The Axicon lens 424 can generate Bessel beams which are one class of nondiffracting beams. Axicon brings a collimated beam to an extended focus which has a Bessel beam profile at its cross section. Theoretically, this principle can be used to extend the axial extent of a PSF. The objective lens collects the diverging light cone from a point source and collimates it. The Axicon focuses the collimated beam at its focal plane. The depth of field of the Axicon lens can be calculated according to Equation 2 below:

$$DOF = \frac{R\sqrt{1 - n^2\sin^2\alpha}}{\sin\alpha\cos\alpha\left(n\cos\alpha - \sqrt{1 - n^2\sin^2\alpha}\right)} \quad \text{Eq. 2}$$

where R is the size of the beam entering Axicon, n is the refractive index of the Axicon, and a is the angle of the Axicon. As shown in the plot 428 of FIG. 4, the DOF can be significantly larger than the DOF of a regular widefield microscope, which results in EDOF microscopy.

Figure 5A:
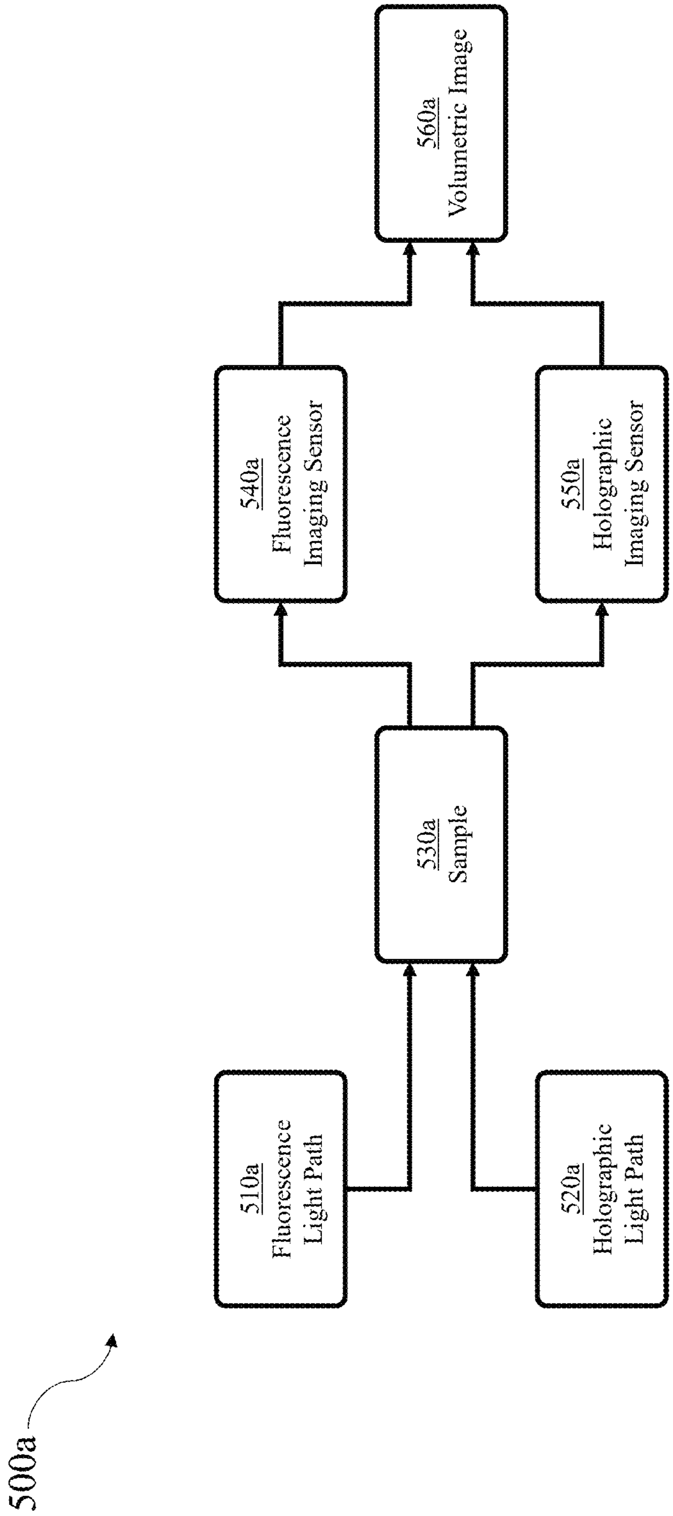
FIG. 5A shows a schematic of an optical imaging tool/system, in accordance with various embodiments.

FIG. 5A shows a schematic of an optical imaging tool/system 500*a*, in accordance with various embodiments. As illustrated in FIG. 5A, the optical imaging tool/system 500*a* includes a fluorescence light/signal path 510*a* and a holographic light/signal path 520*a* that are directed onto the sample 530*a*, where respective signals produced (i.e., EDOF fluorescence signal and DHM signal) can be acquired/capture/obtained at respective sensors, e.g., fluorescence imaging sensor 540*a* and holographic imaging sensor 550*a*, which can then be combined/correlated to generate a volumetric image 560*a*, in accordance with one or more embodiments described herein.

Figure 5B:
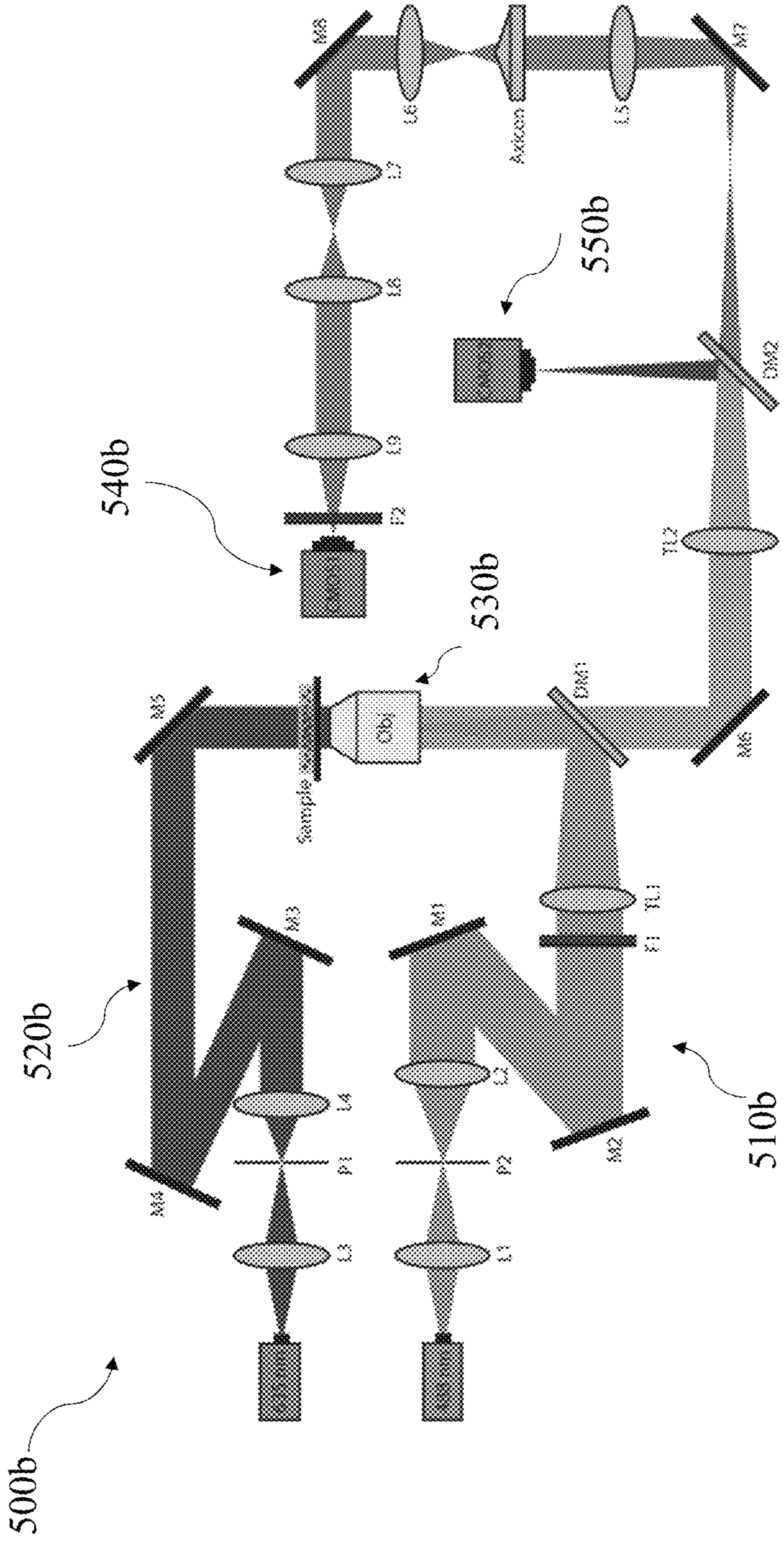
FIG. 5B shows an example optical imaging tool/system, in accordance with various embodiments.

FIG. 5B shows an example optical imaging tool/system 500*b*, in accordance with various embodiments. As illustrated in FIG. 5B, the optical imaging tool/system 500*b* includes a fluorescence light/signal path 510*b* and a holographic light/signal path 520*b* that are directed onto the sample 530*b*, where respective signals produced (i.e., EDOF fluorescence signal and DHM signal) can be acquired/capture/obtained at respective sensors, e.g., fluorescence imaging sensor 540*b* and holographic imaging sensor 550*b*, which can then be combined/correlated to generate a volumetric image (not shown), in accordance with one or more embodiments described herein. For example, a diode laser at 488 nm can be used for the fluorescence light/signal path 510*b* for fluorescence imaging and a diode laser at 635 nm can be used for the holographic light/signal path 520*b* for digital holography. Both laser lights are focused on 20 μm pinholes using L1 and L3 achromatic lenses (L1=L3=30 mm). After spatial filtering, the red laser in the holographic light/signal path 520*b* is collimated with an L4=40 mm lens and guided to the focal plane of an objective lens 530*b* (40×/NA0.75 or 20×/NA0.5). The blue laser in the fluorescence light/signal path 510*b* is collimated with an L2=400 mm lens. A Tube lens of TL1=180 mm is used to focus the blue light at the back focal plane of the objective lens 530*b*. On the detection path a TL2=200 mm and a short pass dichroic mirror (DM2) are used to create the digital hologram, which is recorded by CMOS2, i.e., holographic imaging sensor 550*b*. To create the extended depth of field image a 4f system (TL2=200 mm and L5=100 mm) is used to conjugate the axicon to the back focal plane of the objective lens. The EDOF image is formed at the focal plane of the axicon. The two 4f pairs of L6=30 mm, L7=200 mm, and L8=30 mm, L9=100 mm are used to conjugate the EDOF image to the imaging plane at CMOS1, i.e., fluorescence imaging sensor 540*b*, and adjust the magnification of the fluorescence path to the holography path. F2 and F1 are used as detection and excitation filters in the fluorescence path and a dichroic mirror (DM1) is used to separate the excitation light and emission fluorescence light. In one or more embodiments, a manual or an automatic xy-stage and a motorized z-stage controlled by a DC servo motor controller can be used to measure the three-dimensional PSF of the fluorescence microscope.

Figure 6:
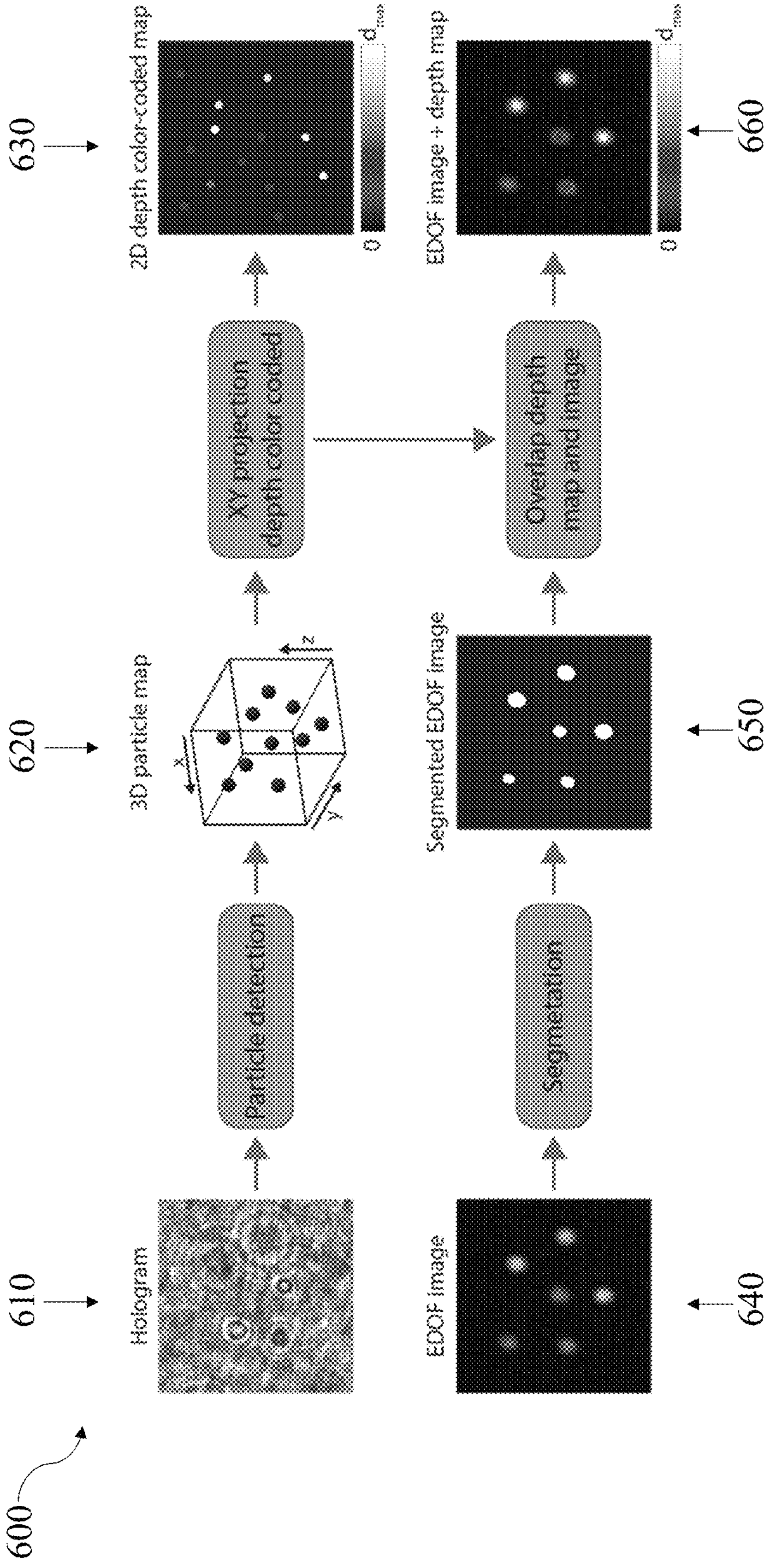
FIG. 6 shows a schematic process flow for imaging processing, in accordance with one or more embodiments.

FIG. 6 shows a schematic process flow 600 for imaging processing, in accordance with one or more embodiments. The process flow 600 includes the following steps:

i) Holographic particle detection: a particle map 620 is generated using a recorded hologram 610. The particle map is three dimensional which means that it contains the positions of the particles in lateral (x and y) and axial (z) dimensions. Any conventional algorithm or machine learning-based approach can be used for this part.

ii) 2D depth color-coded map generation: using the information of the locations of the particles in three dimensions, a depth color-coded map 630 can be generated. The depth color-coded map 630 shows the xy positions of the particles with a circular spot and the depth of the particle is shown by a different color. The color bar under the particle map shows the extent of the depth of the particles between z=0 to z=dmax where dmax is the maximum depth that is used in the particle detection algorithm, in one or more embodiments.

iii) Segmentation of the EDOF image: a segmentation map 650 of the particles is generated from the EDOF fluorescence image 640 for each different fluorescence color. The segmentation map is binary, and it can be generated using a conventional or machine learning-based algorithm, in one or more embodiments.

iv) Overlapping the segmented image and 2D particle map with depth color-coded map: overlapping the 2D depth color-coded map with the segmented image of each different fluorescence color can be implemented to generate EDOF image+depth map 660. For each color, the color-coded spots that match the segmented image of that same fluorescence color is kept and the others are discarded. In doing so, a depth color-coded map for each different fluorescence color is generated.

To verify the imaging technique, 200 nm fluorescent beads are immobilized by poly-L-lysine on a coverslip to measure the 3D PSF of the fluorescence microscope. To record EDOF images and holograms for correlative microscopy, 2 μm fluorescent beads are immobilized in hydrogel. A 7.5% hydrogel solution is made by 40% acrylamide: bisacrylamide, TEMED, and 10% ammonium persulfate in 1×TAE buffer. A resolution target (HIGHRES-2) is used to obtain the accurate magnification of the dual-mode microscope.

The axicon lens does not have a specified focal plane that can be used to calculate the magnification of the disclosed fluorescence microscope imaging system. Therefore, a resolution target is used to obtain the magnification. FIGS. 7A and 7B show images of the resolution target recorded in the bright-field mode for both the fluorescence and holography paths 700*a* and 700*b*, respectively, of the disclosed system, in accordance with various embodiments. In one or more embodiments, the magnification of the fluorescence path is 1.3 times larger than the holography path.

Figure 7C:
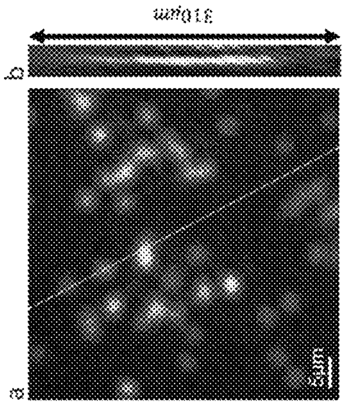
FIG. 7C shows a plot of PSF measurements of the fluorescence microscope imaging system, in accordance with various embodiments.
Figure 7B:
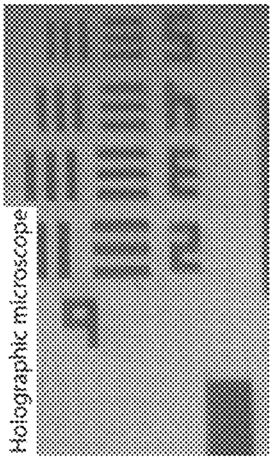
FIGS. 7A and 7B show images of the resolution target recorded in the bright-field mode for both the holography and the fluorescence paths of the disclosed system, in accordance with various embodiments.
Figure 7A:
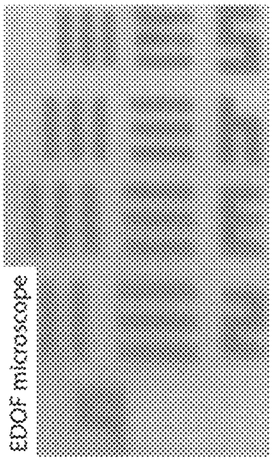

FIG. 7C shows a plot 700*c* of PSF measurements of the fluorescence microscope imaging system, in accordance with various embodiments. For measuring the PSF of the fluorescence microscope, a z-scanning is performed over a range of 310 μm with a step size of 10 μm on a sample 200 nm fluorescent beads along. The plot 700*c* includes (a) xy image and (b) results along the z dimension and the yellow line specified in (a). The plot 700*c* of PSF measurement shows a lateral resolution of 1.03 μm and an axial resolution 130 μm using a 40×/NA0.75 objective lens. According to these results the depth of field is increased more than 70 times by using the axicon lens. The lateral resolution is degraded 3 times approximately, however, to achieve the same depth of field with an objective lens, an NA of 0.09 is required which is equivalent to a lateral resolution 2.92 μm at the same wavelength.

Figures 8A, 8B:
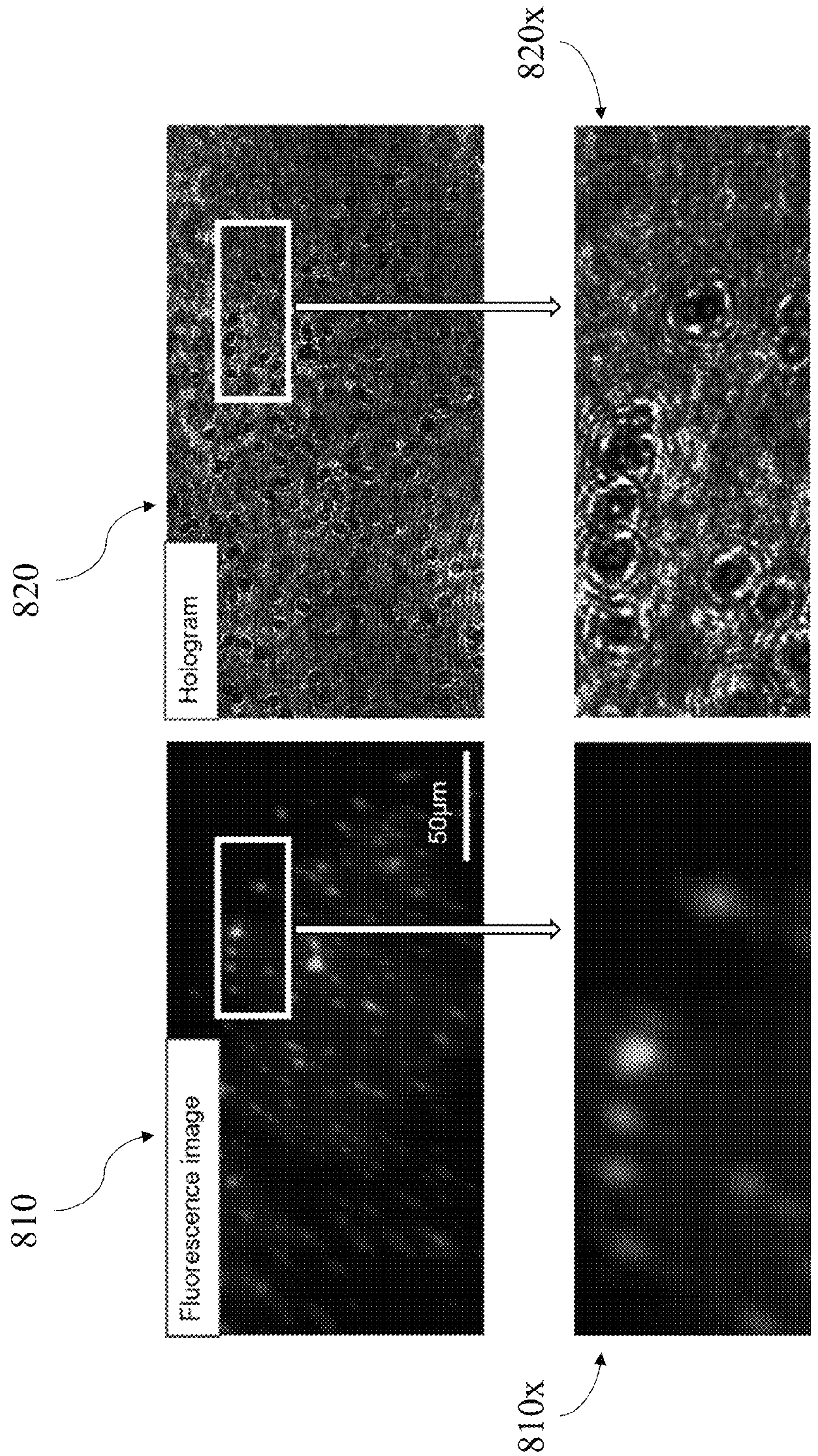
FIGS. 8A and 8B, respectively, show a fluorescence image and a corresponding holographic image (hologram) acquired, simultaneously, of a sample using the disclosed optical imaging tool/system, in accordance with various embodiments.

FIGS. 8A and 8B, respectively, show a fluorescence image 810 and a corresponding holographic image (hologram) 820 acquired, simultaneously, of a sample of 2 μm beads immobilized by poly-L-lysine on a coverslip using the disclosed optical imaging tool/system, in accordance with various embodiments. The magnified regions 810*x* and 820*x*, respectively of the fluorescence image 810 and the holographic image 820 confirm that both images capture the same field of view of the sample.

To perform correlative microscopy as disclosed herein, a sample of 2 μm beads are immobilized in hydrogel and measurements are conducted using the sample.

Figure 9:
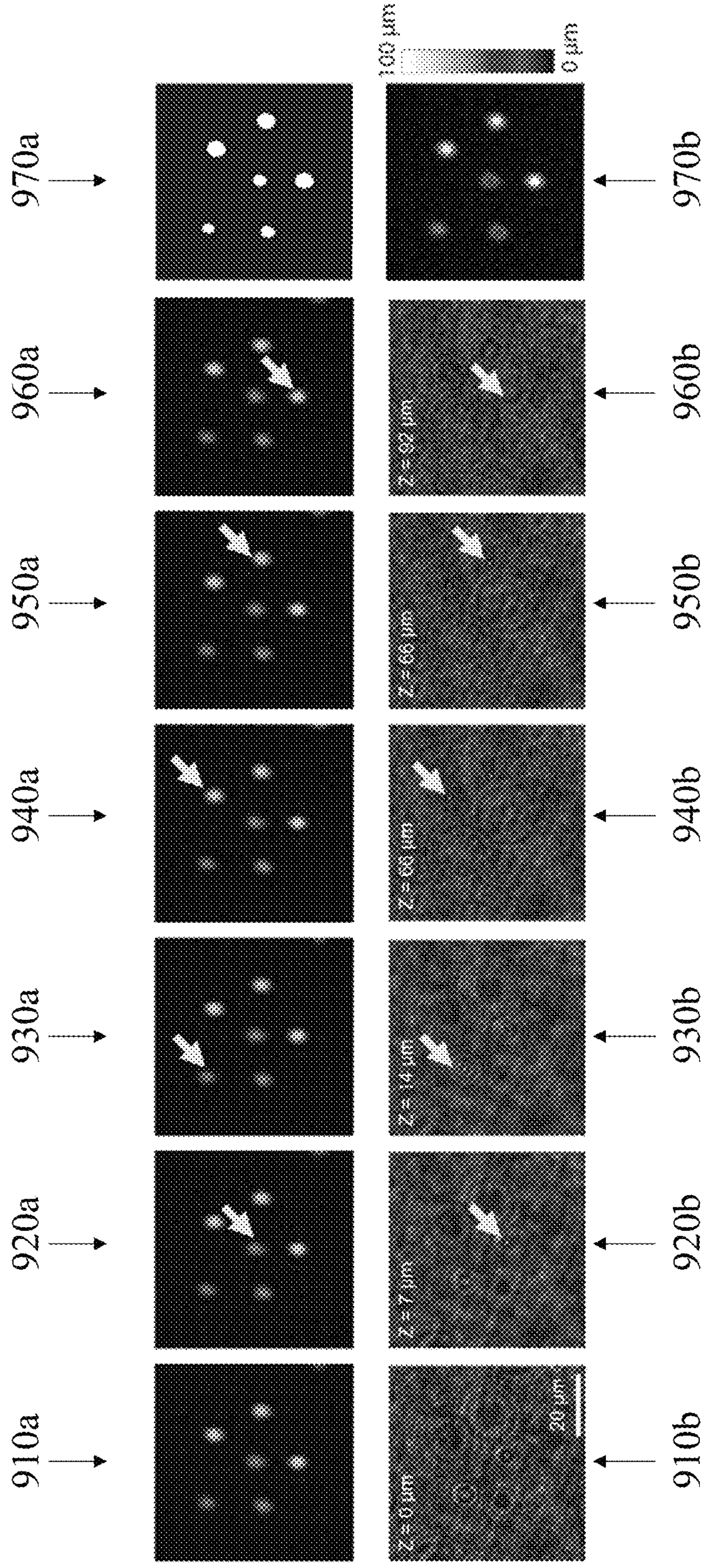
FIG. 9 shows EDOF fluorescence images and holographic images of a sample, in accordance with various embodiments.

FIG. 9 shows EDOF fluorescence images 910*a*, 920*a*, 930*a*, 940*a*, 950*a*, and 960*a* of a sample of beads along with their reconstructed images 910*b*, 920*b*, 930*b*, 940*b*, 950*b*, and 960*b* from the recorded hologram, in accordance with various embodiments. The images were reconstructed by a step size of 1 μm, e.g., from z=0 μm to z=100 μm. The (yellows) arrows point at the beads in the EDOF images and their corresponding images after reconstruction in different depth. The results clearly show that beads at different depth still show up in focus in the fluorescence image and their depth can be extracted after processing their digital hologram. FIG. 9 further shows a segmentation map 970*a* generated from the EDOF fluorescence image and an EDOF image 970*b* with depth color coding for each particle.

Figure 10:
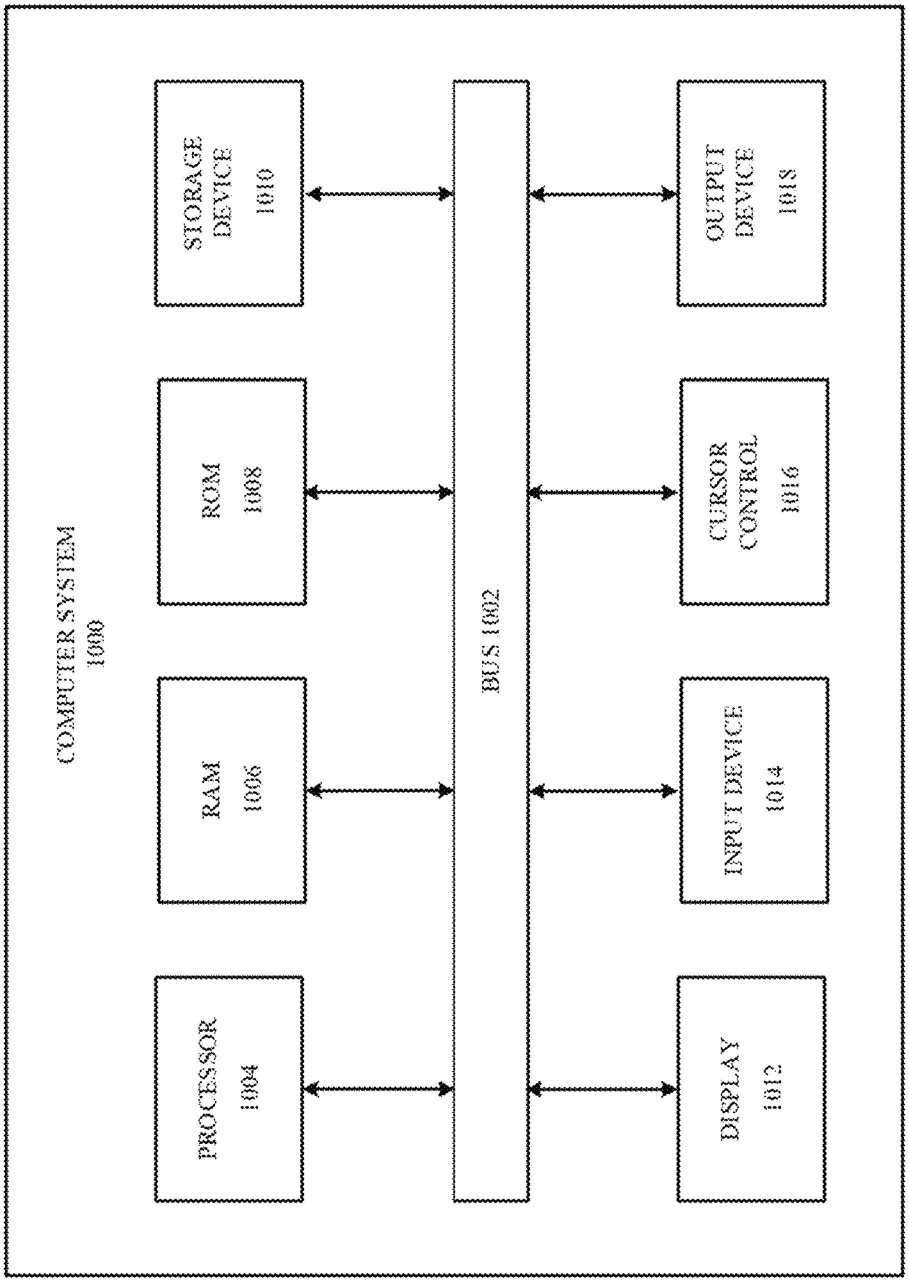
FIG. 10 is a block diagram illustrating an example computer system with which embodiments of the disclosed system and method may be implemented, in accordance with various embodiments.

FIG. 10 is a block diagram illustrating an example computer system 1000, with which embodiments of the disclosed system and method for imaging, in accordance with various embodiments. For example, the illustrated computer system 1000 can be a local or remote computer system operatively connected to the disclosed system and method for performing imaging operations, such as those described with respect to FIGS. 2-9.

In various embodiments of the present teachings, computer system 1000 can include a bus 1002 or other communication mechanism for communicating information and a processor 1004 coupled with bus 1002 for processing information. In various embodiments, computer system 1000 can also include a memory, which can be a random-access memory (RAM) 1006 or other dynamic storage device, coupled to bus 1002 for determining instructions to be executed by processor 1004. Memory can also be used for storing temporary variables or other intermediate information during execution of instructions to be executed by processor 1004. In various embodiments, computer system 1000 can further include a read only memory (ROM) 1008 or other static storage device coupled to bus 1002 for storing static information and instructions for processor 1004. A storage device 1010, such as a magnetic disk or optical disk, can be provided and coupled to bus 1002 for storing information and instructions.

In various embodiments, computer system 1000 can be coupled via bus 1002 to a display 1012, such as a cathode ray tube (CRT) or liquid crystal display (LCD), for displaying information to a computer user. An input device 1014, including alphanumeric and other keys, can be coupled to bus 1002 for communication of information and command selections to processor 1004. Another type of user input device is a cursor control 1016, such as a mouse, a trackball or cursor direction keys for communicating direction information and command selections to processor 1004 and for controlling cursor movement on display 1012. This input device 1014 typically has two degrees of freedom in two axes, a first axis (i.e., x) and a second axis (i.e., y), that allows the device to specify positions in a plane. However, it should be understood that input devices 1014 allowing for 3-dimensional (x, y and z) cursor movement are also contemplated herein. In accordance with various embodiments, components 1012/1014/1016, together or individually, can make up a control system that connects the remaining components of the computer system to the systems herein and methods conducted on such systems, and controls execution of the methods and operation of the associated system.

In various embodiments, the computer system 1000 includes an output device 1018. In various embodiments, the output device 1018 can be a wireless device, a computing device, a portable computing device, a communication device, a printer, a graphical user interface (GUI), a gaming controller, a joy-stick controller, an external display, a monitor, a mixed reality device, an artificial reality device, or a virtual reality device.

Consistent with certain implementations of the present teachings, results can be provided by computer system 1000 in response to processor 1004 executing one or more sequences of one or more instructions contained in memory 1006. Such instructions can be read into memory 1006 from another computer-readable medium or computer-readable storage medium, such as storage device 1010. Execution of the sequences of instructions contained in memory 1006 can cause processor 1004 to perform the processes described herein. Alternatively, hard-wired circuitry can be used in place of or in combination with software instructions to implement the present teachings. Thus, implementations of the present teachings are not limited to any specific combination of hardware circuitry and software.

The term "computer-readable medium" (e.g., data store, data storage, etc.) or "computer-readable storage medium" as used herein refers to any media that participates in providing instructions to processor 1004 for execution. Such a medium can take many forms, including but not limited to, non-volatile media, volatile media, and transmission media. Examples of non-volatile media can include, but are not limited to, dynamic memory, such as memory 1006. Examples of transmission media can include, but are not limited to, coaxial cables, copper wire, and fiber optics, including the wires that comprise bus 1002.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, another memory chip or cartridge, or any other tangible medium from which a computer can read.

In addition to computer-readable medium, instructions or data can be provided as signals on transmission media included in a communications apparatus or system to provide sequences of one or more instructions to processor 1004 of computer system 1000 for execution. For example, a communication apparatus may include a transceiver having signals indicative of instructions and data. The instructions and data are configured to cause one or more processors to implement the functions outlined in the disclosure herein. Representative examples of data communications transmission connections can include, but are not limited to, telephone modem connections, wide area networks (WAN), local area networks (LAN), infrared data connections, NFC connections, etc.

It should be appreciated that the methodologies described herein, flow charts, diagrams and accompanying disclosure can be implemented using computer system 1000 as a standalone device or on a distributed network or shared computer processing resources such as a cloud computing network.

The methodologies described herein may be implemented by various means depending upon the application. For example, these methodologies may be implemented in hardware, firmware, software, or any combination thereof. For a hardware implementation, the processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In various embodiments, the methods of the present teachings may be implemented as firmware and/or a software program and applications written in conventional programming languages such as C, C++, Python, etc. If implemented as firmware and/or software, the embodiments described herein can be implemented on a non-transitory computer-readable medium in which a program is stored for causing a computer to perform the methods described above. It should be understood that the various engines described herein can be provided on a computer system, such as computer system 1000, whereby processor 1004 would execute the analyses and determinations provided by these engines, subject to instructions provided by any one of, or a combination of, memory components 1006/1008/1010 and user input provided via input device 1014.

While the present teachings are described in conjunction with various embodiments, it is not intended that the present teachings be limited to such embodiments. On the contrary, the present teachings encompass various alternatives, modifications, and equivalents, as will be appreciated by those of skill in the art. In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

Figure 11:
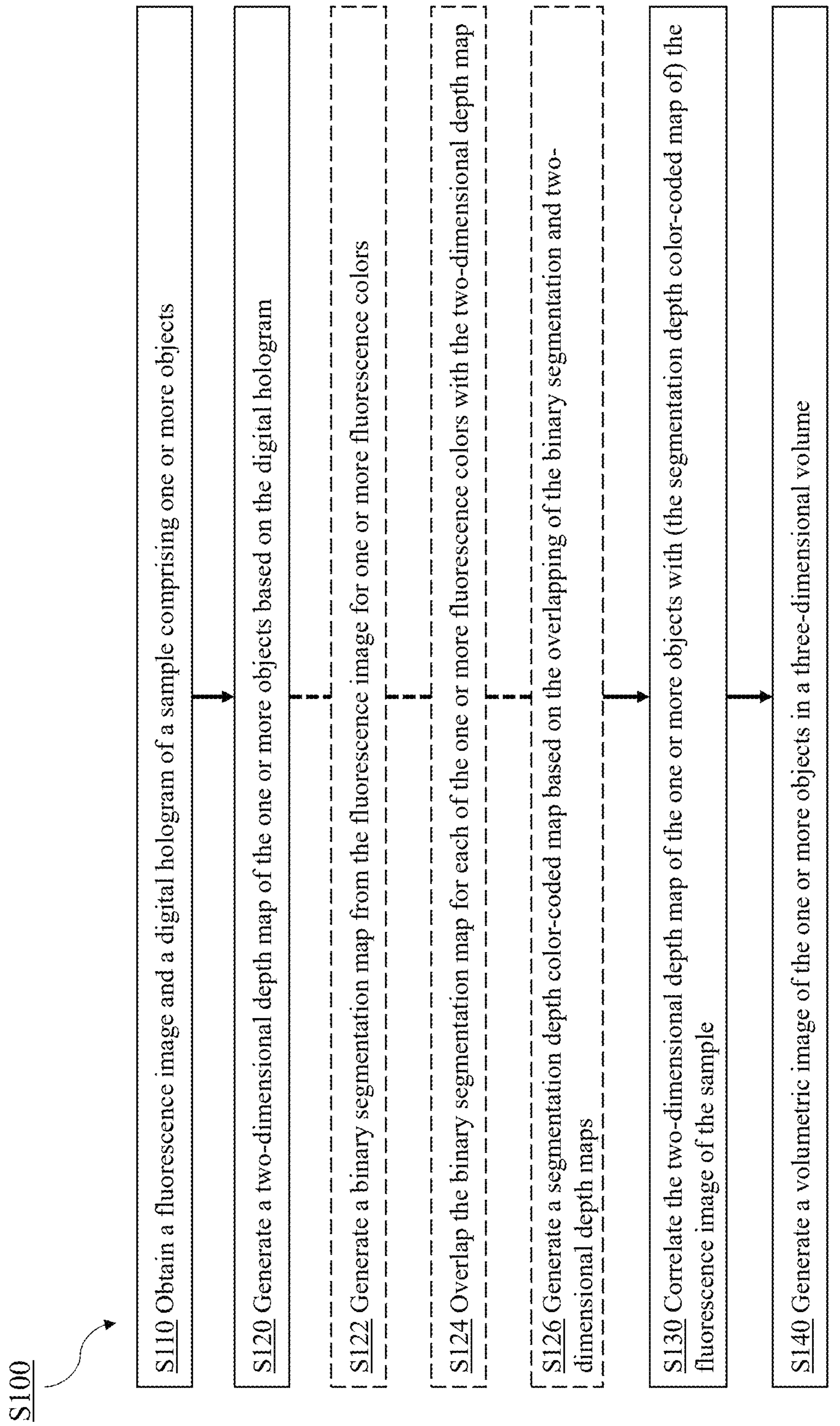
FIG. 11 illustrates a flowchart for a method of imaging, in accordance with one or more embodiments.

FIG. 11 illustrates a flowchart for a method S100 of imaging, in accordance with one or more embodiments. In one or more embodiments, the method S100 may be used for generating a volumetric image of a sample by combining holographic and fluorescence imaging techniques as disclosed herein. As illustrated in FIG. 11, the method S100 includes, at step S110, obtaining, via an optical imaging system, a fluorescence image and a digital hologram of a sample comprising one or more objects; at step S120, generating a two-dimensional depth map of the one or more objects based on the digital hologram; at step S130, correlating the two-dimensional depth map of the one or more objects with the fluorescence image of the sample; and at step S140, generating a volumetric image of the one or more objects in a three-dimensional volume.

In various embodiments of the method S100, generating the two-dimensional depth map may include generating a three-dimensional map of the one or more objects based on the digital hologram; and generating the two-dimensional depth map from the three-dimensional map. In various embodiments of the method S100, generating the three-dimensional map of the one or more objects may include determining position(s) of the one or more objects in the sample via a machine-learning model or algorithm; and generating the three-dimensional map comprising positions of the one or more objects based on the determined position(s) of the one or more objects.

In accordance with one or more embodiments, the method S100 may further include, optionally at step S122, generating a binary segmentation map from the fluorescence image for one or more fluorescence colors. In one or more embodiments, generating the binary segmentation map from the fluorescence image may include applying a machine-learning algorithm to the fluorescence image.

In accordance with one or more embodiments, the method S100 may further include, optionally at step S124, overlapping the binary segmentation map for each of the one or more fluorescence colors with the two-dimensional depth map; and optionally at step S126, generating a segmentation depth color-coded map based on the overlapping of the binary segmentation and two-dimensional depth maps.

In one or more embodiments, the fluorescence image may be obtained via a first sensor of the optical imaging system, such as the optical imaging tool/system 500*a* or 500*b*, and the digital hologram is obtained via a second sensor of the optical imaging system. In one or more embodiments, the fluorescence image may include an extended depth-of-field (EDOF) image acquired via an Axicon lens or an Axicon imaging setup. In various embodiments, the fluorescence image and the digital hologram may be obtained simultaneously, or within a single trigger or a snapshot.

In accordance with one or more embodiments, a system for imaging is provided. The system may be configured for implementing the method S100 of imaging as described with respect to FIG. 11. In one or more embodiments, the system may be configured generating a volumetric image of a sample by combining holographic and fluorescence imaging techniques as disclosed herein. The system may include an optical imaging tool, such as the optical imaging tool/system 500*a* or 500*b*, configured to perform fluorescence microscopy and holographic microscopy; and a processor and a non-transitory computer readable medium operably coupled thereto, the processor operationally coupled and configured to control the optical imaging tool and to acquire data from the optical imaging tool, wherein the non-transitory computer readable medium comprising a plurality of instructions stored in association therewith that are accessible to, and executable by, the processor, to perform one or more operations. Such operations that are implemented on the system, or via the method S100, may include acquiring, via the optical imaging tool, a fluorescence image and a digital hologram of a sample comprising one or more objects; generating a two-dimensional depth map of the one or more objects based on the digital hologram; correlating the two-dimensional depth map of the one or more objects with the fluorescence image of the sample; and generating a volumetric image of the one or more objects in a three-dimensional volume.

In one or more embodiments of the system, generating the two-dimensional depth map may include generating a three-dimensional map of the one or more objects based on the digital hologram; and generating the two-dimensional depth map from the three-dimensional map. In one or more embodiments, generating the three-dimensional map of the one or more objects may include determining position(s) of the one or more objects in the sample via a machine-learning model; and generating the three-dimensional map comprising positions of the one or more objects based on the determined position(s) of the one or more objects.

In one or more embodiments of the system, the one or more operations may further include generating a binary segmentation map from the fluorescence image for one or more fluorescence colors. In one or more embodiments, generating the binary segmentation map from the fluorescence image may include applying a machine-learning algorithm to the fluorescence image.

In one or more embodiments of the system, the one or more operations may further include overlapping the binary segmentation map for each of the one or more fluorescence colors with the two-dimensional depth map; and generating a segmentation depth color-coded map based on the overlapping of the binary segmentation and two-dimensional depth maps.

In one or more embodiments of the system, the optical imaging tool may include a first sensor configured to acquire the fluorescence image; and a second sensor configured to acquire the digital hologram. In one or more embodiments, the optical imaging tool may include an Axicon lens or an Axicon imaging setup and is further configured to acquire an extended depth-of-field (EDOF) fluorescence image. In one or more embodiments, the acquiring of the fluorescence image and the digital hologram occurs simultaneously, or within a single trigger or a snapshot.

In one or more embodiments of the system, the one or more operations may further include acquiring, via the optical imaging tool, a series of fluorescence images and digital holograms of the sample; generating a series of volumetric images of the one or more objects based on the acquired series of fluorescence images and digital holograms; and outputting the volumetric images to a display.

Figure 12:
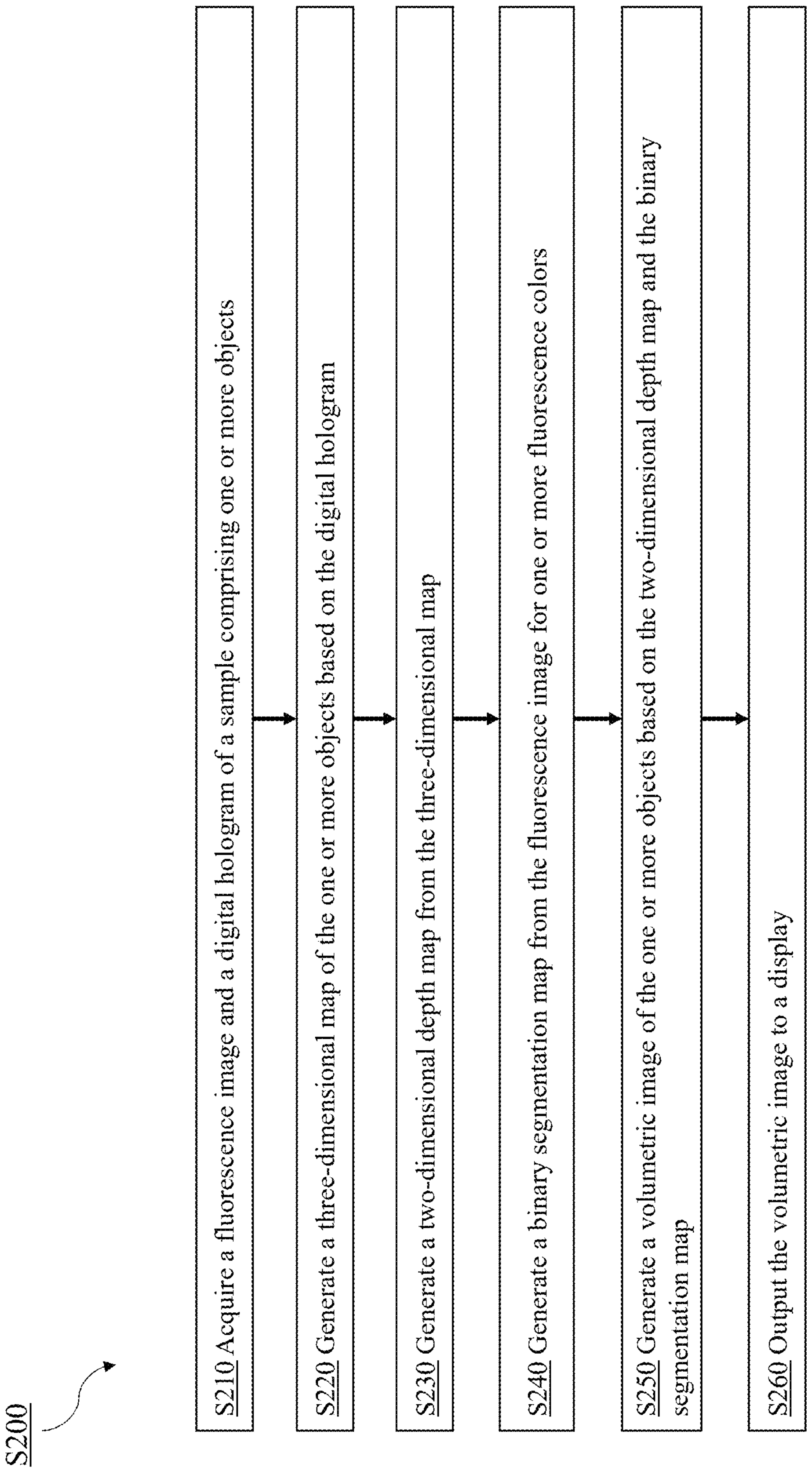
FIG. 12 illustrates a flowchart for another method of imaging, in accordance with one or more embodiments.

FIG. 12 illustrates a flowchart for another method S200 of imaging, in accordance with one or more embodiments. In one or more embodiments, the method S200 may be used for generating a volumetric image of a sample by combining holographic and fluorescence imaging techniques as disclosed herein. As illustrated in FIG. 12, the method S200 includes, at step S210, acquiring a fluorescence image and a digital hologram of a sample comprising one or more objects; at step S220, generating a three-dimensional map of the one or more objects based on the digital hologram; at step S230, generating a two-dimensional depth map from the three-dimensional map; at step S240, generating a binary segmentation map from the fluorescence image for one or more fluorescence colors; at step S250, generating a volumetric image of the one or more objects based on the two-dimensional depth map and the binary segmentation map; and at step S260, outputting the volumetric image to a display.

In various embodiments of the method S200, generating the three-dimensional map of the one or more objects may include determining position(s) of the one or more objects in the sample via a machine-learning model or algorithm; and generating the three-dimensional map comprising positions of the one or more objects based on the determined position (s) of the one or more objects.

In one or more embodiments of the method S200, generating the binary segmentation map from the fluorescence image may include applying a machine-learning algorithm to the fluorescence image. In one or more embodiments, the method S200 may optionally include overlapping the binary segmentation map for each of the one or more fluorescence colors with the two-dimensional depth map; and generating a segmentation depth color-coded map based on the overlapping of the binary segmentation and two-dimensional depth maps.

In one or more embodiments of the method S200, the fluorescence image may be obtained via a first sensor of the optical imaging system, such as the optical imaging tool/system 500*a* or 500*b*, and the digital hologram is obtained via a second sensor of the optical imaging system. In one or more embodiments, the fluorescence image may include an extended depth-of-field (EDOF) image acquired via an Axicon lens or an Axicon imaging setup. In various embodiments, the fluorescence image and the digital hologram may be obtained simultaneously, or within a single trigger or a snapshot.

EMBODIMENTS

Embodiment 1. A method of imaging, comprising: obtaining, via an optical imaging system, a fluorescence image and a digital hologram of a sample comprising one or more objects; generating a two-dimensional depth map of the one or more objects based on the digital hologram; correlating the two-dimensional depth map of the one or more objects with the fluorescence image of the sample; and generating a volumetric image of the one or more objects in a three-dimensional volume.

Embodiment 2. The method of embodiment 1, wherein generating the two-dimensional depth map comprises: generating a three-dimensional map of the one or more objects based on the digital hologram; and generating the two-dimensional depth map from the three-dimensional map.

Embodiment 3. The method of embodiment 2, wherein generating the three-dimensional map of the one or more objects comprises: determining position(s) of the one or more objects in the sample via a machine-learning model or an algorithm; and generating the three-dimensional map comprising positions of the one or more objects based on the determined position(s) of the one or more objects.

Embodiment 4. The method of any one of embodiments 1-3, further comprising: generating a binary segmentation map from the fluorescence image for one or more fluorescence colors.

Embodiment 5. The method of embodiment 4, wherein generating the binary segmentation map from the fluorescence image comprises applying a machine-learning model or an algorithm to the fluorescence image.

Embodiment 6. The method of embodiment 4, further comprising: overlapping the binary segmentation map for each of the one or more fluorescence colors with the two-dimensional depth map; and generating a segmentation depth color-coded map based on the overlapping of the binary segmentation and two-dimensional depth maps.

Embodiment 7. The method of any one of embodiments 1-6, wherein the fluorescence image is obtained via a first sensor of the optical imaging system and the digital hologram is obtained via a second sensor of the optical imaging system.

Embodiment 8. The method of any one of embodiments 1-7, wherein the fluorescence image comprises an extended depth-of-field (EDOF) image acquired via an Axicon lens or an Axicon imaging setup.

Embodiment 9. The method of any one of embodiments 1-8, wherein the fluorescence image and the digital hologram are obtained simultaneously, or within a single trigger or a snapshot.

Embodiment 10. A system comprising: an optical imaging tool configured to perform fluorescence microscopy and holographic microscopy; and a processor and a non-transitory computer readable medium operably coupled thereto, the processor operationally coupled and configured to control the optical imaging tool and to acquire data from the optical imaging tool, wherein the non-transitory computer readable medium comprising a plurality of instructions stored in association therewith that are accessible to, and executable by, the processor, to perform one or more operations, which comprise: acquiring, via the optical imaging tool, a fluorescence image and a digital hologram of a sample comprising one or more objects; generating a two-dimensional depth map of the one or more objects based on the digital hologram; correlating the two-dimensional depth map of the one or more objects with the fluorescence image of the sample; and generating a volumetric image of the one or more objects in a three-dimensional volume.

Embodiment 11. The system of embodiment 10, wherein generating the two-dimensional depth map comprises: generating a three-dimensional map of the one or more objects based on the digital hologram; and generating the two-dimensional depth map from the three-dimensional map.

Embodiment 12. The system of embodiment 11, wherein generating the three-dimensional map of the one or more objects comprises: determining position(s) of the one or more objects in the sample via a machine-learning model or an algorithm; and generating the three-dimensional map comprising positions of the one or more objects based on the determined position(s) of the one or more objects.

Embodiment 13. The system of any one of embodiments 10-12, wherein the one or more operations further comprises: generating a binary segmentation map from the fluorescence image for one or more fluorescence colors.

Embodiment 14. The system of embodiment 13, wherein generating the binary segmentation map from the fluorescence image comprises applying a machine-learning model or an algorithm to the fluorescence image.

Embodiment 15. The system of embodiment 13, wherein the one or more operations further comprises: overlapping the binary segmentation map for each of the one or more fluorescence colors with the two-dimensional depth map; and generating a segmentation depth color-coded map based on the overlapping of the binary segmentation and two-dimensional depth maps.

Embodiment 16. The system of any one of embodiments 10-15, wherein the optical imaging tool comprises: a first sensor configured to acquire the fluorescence image; and a second sensor configured to acquire the digital hologram.

Embodiment 17. The system of any one of embodiments 10-16, wherein the optical imaging tool comprises an Axicon lens or an Axicon imaging setup and is further configured to acquire an extended depth-of-field (EDOF) fluorescence image.

Embodiment 18. The system of any one of embodiments 10-17, wherein the acquiring of the fluorescence image and the digital hologram occurs simultaneously, or within a single trigger or a snapshot.

Embodiment 19. The system of any one of embodiments 10-18, wherein the one or more operations further comprises: acquiring, via the optical imaging tool, a series of fluorescence images and digital holograms of the sample; generating a series of volumetric images of the one or more objects based on the acquired series of fluorescence images and digital holograms; and outputting the volumetric images to a display.

Embodiment 20. A method, comprising: acquiring a fluorescence image and a digital hologram of a sample comprising one or more objects; generating a three-dimensional map of the one or more objects based on the digital hologram; generating a two-dimensional depth map from the three-dimensional map; generating a binary segmentation map from the fluorescence image for one or more fluorescence colors; generating a volumetric image of the one or more objects based on the two-dimensional depth map and the binary segmentation map; and outputting the volumetric image to a display.

Embodiment 21. The method of embodiment 20, wherein generating the three-dimensional map of the one or more objects may include determining position(s) of the one or more objects in the sample via a machine-learning model or algorithm; and generating the three-dimensional map comprising positions of the one or more objects based on the determined position(s) of the one or more objects.

Embodiment 22. The method of embodiments 20 or 21, wherein generating the binary segmentation map from the fluorescence image may include applying a machine-learning algorithm to the fluorescence image.

Embodiment 23. The method of any one of embodiments 20-22, the method further includes overlapping the binary segmentation map for each of the one or more fluorescence colors with the two-dimensional depth map; and generating a segmentation depth color-coded map based on the overlapping of the binary segmentation and two-dimensional depth maps.

Embodiment 24. The method of any one of embodiments 20-23, wherein the fluorescence image may be obtained via a first sensor of the optical imaging system, and the digital hologram is obtained via a second sensor of the optical imaging system.

Embodiment 25. The method of any one of embodiments 20-24, wherein the fluorescence image may include an extended depth-of-field (EDOF) image acquired via an Axicon lens or an Axicon imaging setup.

Embodiment 26. The method of any one of embodiments 20-25, wherein the fluorescence image and the digital hologram may be obtained simultaneously, or within a single trigger or a snapshot.

What is claimed is:

1. A method of imaging, comprising:

providing an optical imaging system having:

1) an Axicon lens or imaging setup comprising a multicolor light-source configured for extended depth of field (EDOF) fluorescence imaging, and 2) a laser light-source configured for digital holography;

obtaining, via the optical imaging system, an EDOF fluorescence image of a sample comprising one or more moving objects illuminated by the multicolor light-source;

obtaining, via the optical imaging system, a digital hologram of the one or more moving objects illuminated by the laser light-source, wherein the EDOF fluorescence image and the digital hologram are obtained simultaneously;

generating a two-dimensional depth color-coded map of the one or more moving objects based on reconstruction of the digital hologram, wherein the two-dimensional depth color-coded map comprises x and y coordinates of the one or more moving objects and wherein each color-code indicates a z plane of the two-dimensional depth color-coded map;

generating a binary segmentation map from the EDOF fluorescence image for one or more fluorescence colors;

overlapping the binary segmentation map with the two-dimensional depth color-coded map; and producing a segmentation depth color-coded map based on the overlapping for each of the one or more fluorescence colors.

2. The method of claim 1, wherein generating the two-dimensional color-coded depth map comprises:

generating a three-dimensional map of the one or more moving objects based on the digital hologram; and generating the two-dimensional depth map from the three-dimensional map wherein each color-code represents depth of the one or more moving objects.

3. The method of claim 2, wherein generating the three-dimensional map of the one or more moving objects comprises:

determining position(s) of the one or more moving objects in the sample via a machine-learning model or an algorithm; and generating the three-dimensional map comprising positions of the one or more moving objects based on the determined position(s) of the one or more moving objects.

4. The method of claim 1, wherein the x and y coordinates provide two-dimensional location(s) or position(s) of color-coded spots and each color-code indicates a depth z for each different fluorescent color in the EDOF fluorescence image.

5. The method of claim 1, wherein generating the binary segmentation map from the EDOF fluorescence image comprises applying a machine-learning model or an algorithm to the EDOF fluorescence image.

6. The method of claim 1, wherein the EDOF fluorescence image is obtained via a first sensor of the optical imaging system and the digital hologram is obtained via a second sensor of the optical imaging system.

7. A system comprising:

an optical imaging tool configured to perform fluorescence microscopy and holographic microscopy, the optical imaging tool comprising:

1) An Axicon lens or imaging setup comprising a multicolor light-source configured for extended depth of field (EDOF) fluorescence imaging, and 2) a laser light-source configured for digital holography; and a processor and a non-transitory computer readable medium operably coupled thereto, the processor operationally coupled and configured to control the optical imaging tool and to acquire data from the optical imaging tool, wherein the non-transitory computer readable medium comprising a plurality of instructions stored in association therewith that are accessible to, and executable by, the processor, to perform one or more operations, which comprise:

acquiring, via the optical imaging tool, an EDOF fluorescence image of a sample comprising one or more objects illuminated by the multicolor light-source;

acquiring, via the optical imaging tool, a digital hologram of the one or more objects illuminated by the laser light-source, wherein the EDOF fluorescence image and the digital hologram are acquired simultaneously;

generating a two-dimensional depth map of the one or more objects based on the digital hologram;

generating a binary segmentation map from the EDOF fluorescence image for one or more fluorescence colors;

overlapping the binary segmentation map with the two-dimensional depth map; and producing a segmentation depth map based on the overlapping for each of the one or more fluorescence colors.

8. The system of claim 7, wherein generating the two-dimensional depth map comprises:

generating a three-dimensional map of the one or more objects based on the digital hologram; and generating the two-dimensional depth map from the three-dimensional map.

9. The system of claim 8, wherein generating the three-dimensional map of the one or more objects comprises:

determining position(s) of the one or more objects in the sample via a machine-learning model or an algorithm; and generating the three-dimensional map comprising positions of the one or more objects based on the determined position(s) of the one or more objects.

10. The system of claim 7, wherein generating the binary segmentation map from the EDOF fluorescence image comprises applying a machine-learning model or an algorithm to the EDOF fluorescence image.

11. The system of claim 7, wherein the optical imaging tool comprises:

a first sensor configured to acquire the EDOF fluorescence image; and a second sensor configured to acquire the digital hologram.

12. The system of claim 7, wherein the two-dimensional depth map comprises a two-dimensional depth color-coded map, wherein the two-dimensional depth color-coded map comprises x and y coordinates of the one or more objects, and wherein each color-code indicates a z plane of the two-dimensional depth color-coded map.

13. The system of claim 12, wherein the x and y coordinates provide two-dimensional location(s) or position(s) of color-coded spots and each color-code indicates a depth z for each different fluorescent color in the EDOF fluorescence image.

14. The system of claim 7, wherein the one or more operations further comprises:

acquiring, via the optical imaging tool, a series of EDOF fluorescence images and digital holograms of the sample;

generating a series of volumetric images of the one or more objects based on the acquired series of EDOF fluorescence images and digital holograms; and outputting the volumetric images to a display.

15. A method, comprising:

providing an optical imaging apparatus having:

1) An Axicon lens comprising a multicolor light-source configured for extended depth of field (EDOF) fluorescence imaging, and 2) A laser light-source configured for digital holography;

simultaneously acquiring an EDOF fluorescence image and a digital hologram of a sample comprising one or more objects, wherein the EDOF fluorescence image is acquired via light illuminated by the multicolor light-source, and wherein the digital hologram is acquired via light illuminated by the laser light-source;

generating a three-dimensional map of the one or more objects based on the digital hologram;

generating a two-dimensional depth map from the three-dimensional map;

generating a binary segmentation map from the EDOF fluorescence image for one or more fluorescence colors;

generating a volumetric image of the one or more objects based on the two-dimensional depth map and the binary segmentation map; and outputting the volumetric image to a display.

16. The method of claim 15, wherein generating the binary segmentation map from the EDOF fluorescence image comprises applying a machine-learning model or an algorithm to the EDOF fluorescence image.

17. The method of claim 15, wherein the EDOF fluorescence image is obtained via a first sensor of the optical imaging apparatus and the digital hologram is obtained via a second sensor of the optical imaging apparatus.

18. The method of claim 15, wherein the two-dimensional depth map comprises a two-dimensional depth color-coded map, wherein the two-dimensional depth color-coded map comprises x and y coordinates of the one or more objects, and wherein each color-code indicates a z plane of the two-dimensional depth color-coded map.

19. The method of claim 18, wherein the x and y coordinates provide two-dimensional location(s) or position(s) of color-coded spots and each color-code indicates a depth z for each different fluorescent color in the EDOF fluorescence image.

* * * * *